United States Patent
Wagner (10) Patent No.: US 6,570,594 B1
(45) Date of Patent: *May 27, 2003

(54) USER INTERFACE WITH NON-INTRUSIVE DISPLAY ELEMENT

(75) Inventor: Annette Wagner, Los Altos, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,146

(22) Filed: Jun. 30, 1998

(51) Int. Cl.[7] .................................................. G09G 5/00
(52) U.S. Cl. ........................ 345/786; 345/781; 345/784; 345/787
(58) Field of Search ................................. 345/123, 125, 345/124, 113, 345, 340, 341, 342, 337, 338, 347, 781–789, 706–709, 808, 809, 629, 635, 684, 687, 688; 707/531, 529

(56) References Cited

U.S. PATENT DOCUMENTS

| | | | | |
|---|---|---|---|---|
| 5,155,836 A | * | 10/1992 | Jordan et al. ................. | 703/13 |
| 5,283,560 A | * | 2/1994 | Bartlett ........................ | 345/113 |
| 5,524,196 A | * | 6/1996 | Blades ........................ | 345/326 |
| 5,528,259 A | * | 6/1996 | Bates et al. .................. | 345/121 |
| 5,579,466 A | * | 11/1996 | Habib .......................... | 707/529 |
| 5,651,107 A | * | 7/1997 | Frank et al. ................. | 345/344 |
| 5,655,094 A | * | 8/1997 | Cline et al. .................. | 345/342 |
| 5,659,791 A | * | 8/1997 | Nekajima et al. ........... | 707/539 |
| 5,712,995 A | * | 1/1998 | Cohn ........................... | 345/342 |
| 5,822,123 A | * | 10/1998 | Davis et al. ................. | 345/113 |
| 5,959,628 A | * | 9/1999 | Cecchini et al. ............ | 345/347 |
| 5,977,972 A | * | 11/1999 | Bates et al. .................. | 345/341 |
| 5,995,101 A | * | 11/1999 | Clark et al. ................. | 345/338 |
| 5,995,984 A | * | 11/1999 | Lau et al. ..................... | 707/505 |
| 6,014,140 A | * | 1/2000 | Strand ......................... | 345/341 |
| 6,072,489 A | * | 6/2000 | Gough et al. ............... | 345/345 |
| 6,101,498 A | * | 8/2000 | Scaer et al. .................. | 707/10 |
| 6,239,797 B1 | * | 5/2001 | Hills et al. .................. | 707/509 |

OTHER PUBLICATIONS

Microsoft Office screen shots, 1996.*

* cited by examiner

Primary Examiner—Kristine Kincaid
Assistant Examiner—Thomas J Joseph
(74) Attorney, Agent, or Firm—Finnegan, Henderson, Farabow, Garrett & Dunner, L.L.P.

(57) ABSTRACT

Methods, systems, and articles of manufacture consistent with the present invention improve display systems by providing a non-intrusive user interface where an application displays data in a designated area of a display screen that otherwise hides the data from view. The designated area contains at least one control element that, when selectively triggered, invokes a particular operation.

100 Claims, 4 Drawing Sheets

FIG. 1

THE GETTYSBURG ADDRESS

FOUR SCORE AND SEVEN YEARS AGO OUR FATHERS BROUGHT FORTH ON THIS CONTINENT, A NEW NATION, CONCEIVED IN LIBERTY, AND DEDICATED TO THE PROPOSITION THAT ALL MEN ARE CREATED EQUAL.

NOW WE ARE ENGAGED IN A GREAT CIVIL WAR, TESTING WHETHER THAT NATION, OR ANY NATION SO CONCEIVED AND SO DEDICATED, CAN LONG ENDURE. WE ARE MET ON A GREAT BATTLEFIELD OF THAT WAR. WE HAVE COME TO DEDICATE A PORTION OF THAT FIELD, AS A FINAL RESTING PLACE FOR THOSE WHO HERE GAVE THEIR LIVES THAT THAT NATION MIGHT LIVE. IT IS ALTOGETHER FITTING AND PROPER THAT WE SHOULD DO THIS.

BUT IN A LARGER SENSE, WE CANNOT DEDICATE - WE CANNOT CONSECRATE - WE CANNOT HALLOW - THIS GROUND. THE BRAVE MEN, LIVING AND DEAD, WHO STRUGGLED HERE, HAVE CONSECRATED IT, FAR ABOVE OUR POOR POWER TO ADD OR DETRACT. THE WORLD WILL LITTLE NOTE, NOR LONG REMEMBER, WHAT WE SAY HERE, BUT IT CAN NEVER FORGET WHAT THEY DID HERE. IT IS FOR US THE LIVING, RATHER, TO BE DEDICATED HERE TO THE UNFINISHED WORK WHICH THEY WHO FOUGHT HERE HAVE THUS FAR SO NOBLY ADVANCED. IT IS RATHER FOR US TO BE HERE DEDICATED TO THE GREAT TASK REMAINING BEFORE US - THAT FROM THESE HONORED DEAD WE MAY TAKE INCREASED DEVOTION TO THAT CAUSE FOR WHICH THEY GAVE THE LAST FULL MEASURE OF DEVOTION - THAT WE HERE HIGHLY RESOLVE THAT THESE DEAD SHALL NOT HAVE DIED IN VAIN - THAT THIS NATION, UNDER GOD, SHALL HAVE A NEW BIRTH OF FREEDOM - AND THAT GOVERNMENT OF THE PEOPLE, BY THE PEOPLE, FOR THE PEOPLE, SHALL NOT PERISH FROM THE EARTH.

ABRAHAM LINCOLN - NOVEMBER 19, 1863

BATTLE OF GETTYSBURG

THIS MOST FAMOUS AND MOST IMPORTANT CIVIL WAR BATTLE OCCURRED OVER THREE HOT SUMMER DAYS, JULY 1 TO JULY 3, 1863, AROUND THE SMALL MARKET TOWN OF GETTYSBURG, PENNSYLVANIA. IT BEGAN AS A SKIRMISH BUT BY ITS END INVOLVED 160,000 AMERICANS.

BEFORE THE BATTLE, MAJOR CITIES IN THE NORTH SUCH AS PHILADELPHIA, BALTIMORE AND EVEN WASHINGTON WERE UNDER THREAT OF ATTACK FROM GENERAL ROBERT E. LEE'S

USER INTERFACE WITH NON-INTRUSIVE DISPLAY ELEMENT

BACKGROUND OF THE INVENTION

A. Field of the Invention

The present invention generally relates to user interfaces for systems, and more particularly, to a user interface with a non-intrusive display element.

B. Description of the Related Art

Existing systems utilize user interface controls, such as scroll bars, which occupy a dedicated field of a display screen, and make the portion of the display screen dedicated to the user interface control unavailable to display data. Existing user interface controls intrude constantly on display screen space that would otherwise be available to display data—including during times when a user is not utilizing the user interface control, and the user interface control is not needed. Conventional user interface controls reduce the amount of data that can be displayed on a display screen, thus making it difficult for a user to read, write, edit, and otherwise utilize the data.

Previous attempts to improve conventional display systems have increased the amount of data that can be displayed on a display screen by reducing the size of user interface controls, such as scroll bars. The disadvantage of this technique is that a small scroll bar is difficult to activate and use. Also, smaller conventional scroll bars still have the disadvantage of reducing the amount of display screen space available to display data.

Accordingly, there is a need for a display system with minimal display interference from interface control elements.

SUMMARY OF THE INVENTION

Methods, systems, and articles of manufacture consistent with the present invention improve display systems by providing a non-intrusive user interface where an application displays data viewable in a designated area of a display screen that otherwise hides the data from view. The designated area contains at least one active control element that, when selectively triggered, invokes a particular operation.

In accordance with one aspect of the present invention, various display techniques can be used to distinguish the area designated for the control element from other areas of the display screen, including the use of a color or shade different from a surrounding or adjacent area of the display screen, provided it is still possible to view data in the designated area. The control element can be triggered using a control device.

In accordance with another aspect of the invention, in response to a signal from the control device, the control element can be triggered without the control element ever coming in to view. Alternatively, in response to a signal from the control device, the control element comes in to view before it is triggered. The control element can also be distinguishable from the designated area using a different color or shade. In accordance with one aspect of the invention, when in view the control element may obscure data from view within the designated area or it too can be configured to permit continued view of data within the designated area.

In accordance with yet another aspect of the present invention, as embodied and broadly described herein, methods, systems, and articles of manufacture provide a non-intrusive user interface where an application displays data on a display screen viewable in both an information display field and a scroll bar field and permit selective alteration of a view of data in both fields in response to an indication to make such an alteration. The indication may result from a user manipulating a cursor control device to trigger an active scroll bar element in the scroll bar field. The scroll bar element may be used for scrolling through data viewable on the display screen.

When the cursor is in the scroll bar field, or alternatively, within a vicinity of the scroll bar field, for a period longer than a default time period, the elements are displayed in either a semi-transparent form permitting continued view of data in the scroll bar field or in an opaque form that obscures the data displayed in the scroll bar field from view. As yet another alternative, the elements may be displayed immediately upon determining that the cursor is in, or in the vicinity of, the scroll bar field. After the user manipulates the control device to move the cursor out of the scroll bar field, the display returns to its original form.

BRIEF DESCRIPTION OF THE DRAWINGS

The accompanying drawings, which are incorporated in and constitute a part of this specification and, together with the description, serve to explain the principles of the invention. In the drawings.

FIG. 2 is an exemplary display illustrating one view of an interface consistent with the present invention;

DETAILED DESCRIPTION

The following detailed description of the invention refers to the accompanying drawings. The description includes exemplary implementations; other implementations are possible, and changes may be made to the implementations described without departing from the spirit and scope of the invention. The following detailed description does not limit the invention. Instead, the scope of the invention is defined by the appended claims.

Introduction

An implementation consistent with the principles of present invention includes a user interface. A "user interface" refers to a mechanism to view a representation of information in a system, such as a computer, personal digital assistant, or other electronic device that includes a display, and to enter information into the system. The entered information may include commands instructing the system to perform a particular function.

Methods, systems, and articles of manufacture consistent with the present invention improve display systems by providing a non-intrusive user interface where an application displays data in a designated area of a display screen that otherwise hides the data from view. The designated area contains at least one control element that, when selectively triggered, invokes a particular operation.

In accordance with one implementation, various display techniques can be used to distinguish the area designated for the control element from other areas of the display screen, including the use of a color or shade different from surrounding or adjacent area of the display screen, provided it is still possible to view data in the designated area. The control element can be triggered using a control device.

In response to a signal from the control device, the control element can be triggered without it ever coming in to view. Alternatively, in response to a signal from the control device, the control element comes in to view before it is triggered.

The control element can also be distinguishable from the designated area using a different color or shade. When in view the control element may obscure data from view within the designated area or it too can be configured to permit continued view of data within the designated area.

In another implementation, data is viewable in both an information display field and a scroll bar field located in an area adjacent the information display field and reserved for an active scroll bar element(s). When selectively triggered, the element in this implementation enables a function for scrolling through data on the display screen.

Since a scroll bar field in this implementation does not obscure data from view, such a scroll bar field may be displayed on either side, the bottom or top, any other selected location on the display, or in more than one location, depending upon a configuration of the interface. The active scroll bar elements in the scroll bar field are selectively triggered in response to signals from a cursor control device. When a user directs a cursor into the scroll bar field by manipulating the cursor control device, a scroll bar element in the scroll bar field may be used for scrolling through data viewable on the display screen. Scroll bar elements typically include two directional elements, such an up arrow element and a down arrow element, and an intermediate element often referred to as a thumb. However, an one or more of these or similar elements may be used, depending upon a particular configuration.

When the cursor is in the scroll bar field, or alternatively when it is within a vicinity of the scroll bar field, for a period longer than a default time period (for example, one or more seconds depending on a particular configuration), the elements are displayed in either a semi-transparent form permitting continued view of data in the scroll bar field or in an opaque form that obscures the data displayed in the scroll bar field from view. The default time period may be even less than one second, making it appear to the user that the scroll bar elements are displayed automatically or instantaneously when the cursor enters or is within the vicinity of the scroll bar field. After the user manipulates the control device to move the cursor out of the scroll bar field, the display returns to its original form.

Computer System

Figure 1:
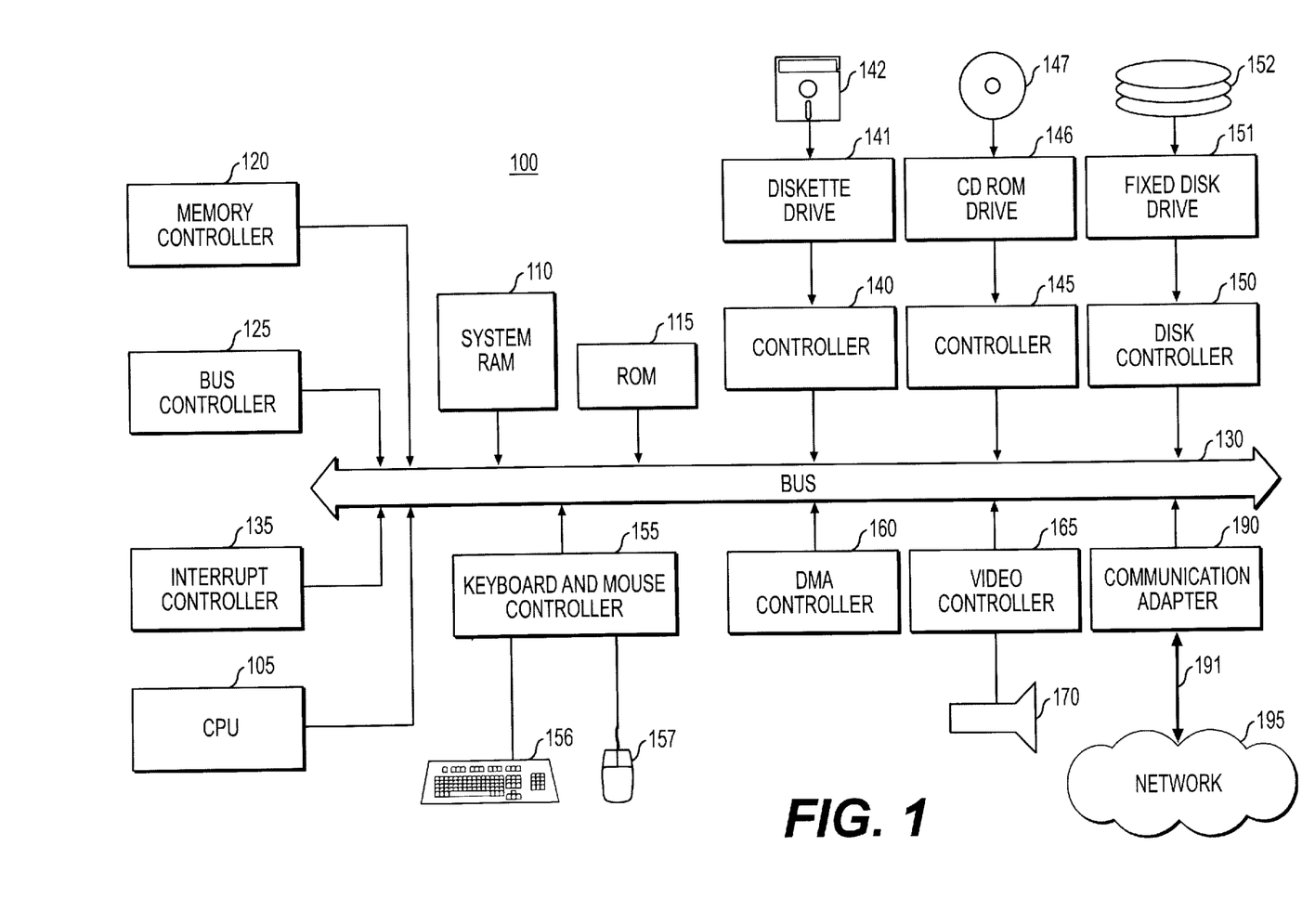
FIG. 1 is a block diagram of a computer system in which interfaces consistent with the present invention may be implemented.

FIG. 1 illustrates the system architecture for a computer system with which methods, systems, and articles of manufacture consistent with the invention may be implemented. Those skilled in the art will recognize that methods, systems, and articles of manufacture consistent with the principles of the present invention can be implemented in other devices with display screens, including, for example, personal digital assistants. The exemplary computer system of FIG. 1 is therefore included for descriptive purposes only. Although the description may refer to terms commonly used in describing particular computer systems, such as in IBM PS2 personal computer, the description and concepts equally apply to other computer systems such as network computers, work stations, and main frame computers having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. Interrupt controller 135 is used for receiving and processing various interrupt signals from the system components.

Mass storage may be provided by diskette 142, CD ROM 147, or a hard disk drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disk 152 is part of a fixed disk drive 151, which is connected to bus 130 by controller 150.

Methods consistent with the principles of the present invention may be implemented in computer software to provide a non-intrusive scroll bar and related operations described herein. Such methods may be stored in any one of the available computer readable media in system 100. However, one skilled in the art will appreciate that computer-readable media is not limited to the secondary storage devices, like hard disks, floppy disks, or CD-ROM, or RAM or ROM, like those depicted in FIG. 1. It also includes media like a carrier wave from a network, such as the Internet.

User input to computer system 100 may be provided by a number of devices. For example, a keyboard 156 and mouse 157 are connected to bus 130 by controller 155. It will be obvious to those skilled in the art that other input devices may be used as alternatives or in conjunction with those shown in FIG. 1 without departing from the principles of the present invention, such as a glide pad, button, or an audio transducer may be connected to bus 130 via an appropriate controller.

DMA controller 160 is provided for performing direct memory access to RAM 110. A visual display is generated by video controller 165 which controls video display 170. Computer system 100 also includes a communication adapter 190 which allows the system to be interconnected to a local area network (LAN), a wide area network (WAN), or the Internet, schematically illustrated by bus 191 and network 195.

Operation of computer system 100 is generally controlled and coordinated by operating system software, which may be single or multiple threaded. The operating system controls allocation of system resources and performs tasks such as process scheduling, memory management, networking, and I/O services, among other things.

Non-Intrusive User Interface

Figure 3:
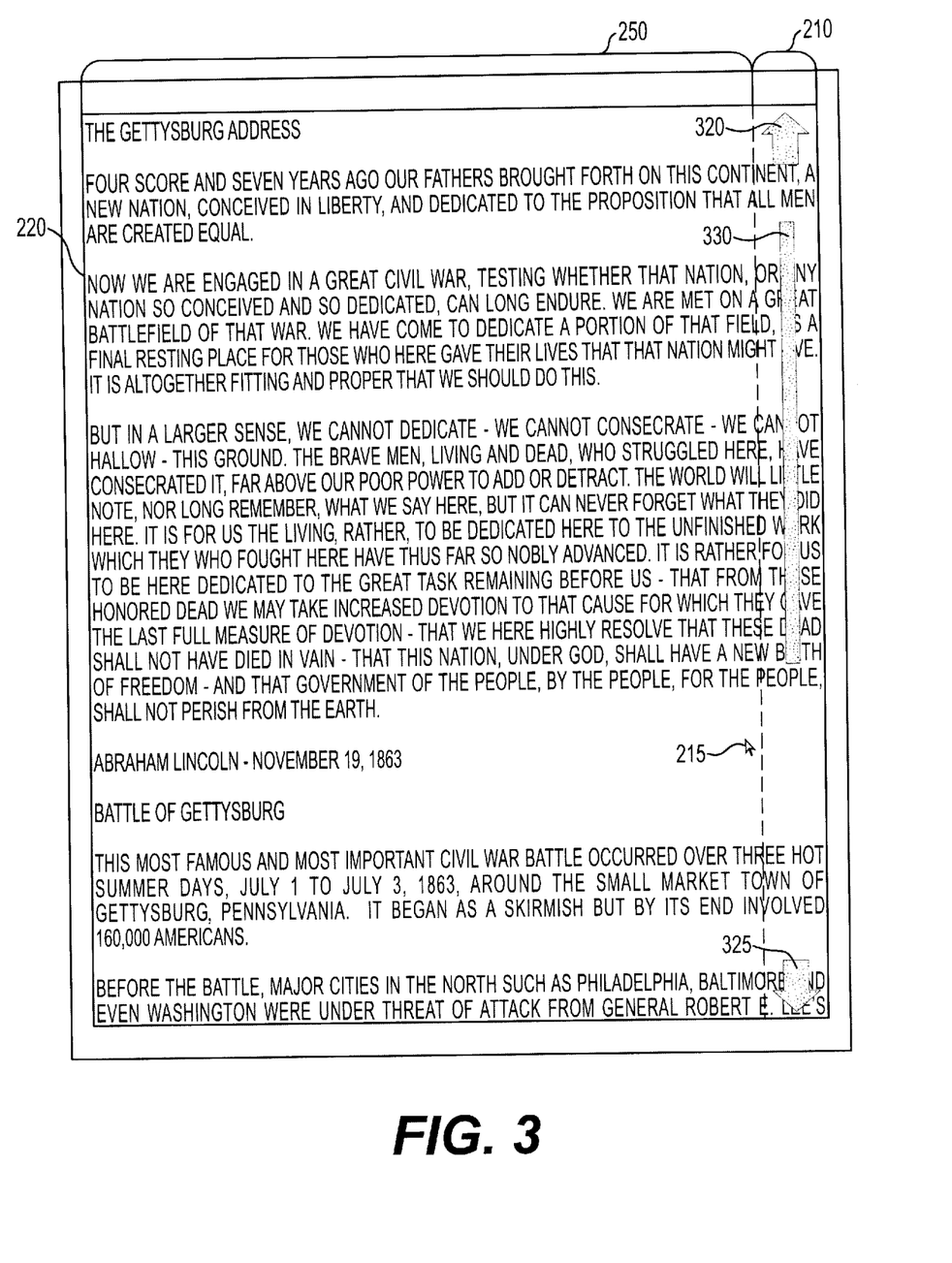
FIG. 3 is an exemplary display illustrating another view of an interface consistent with the present invention.

FIGS. 2 and 3 are diagrams of exemplary display screens depicting a non-intrusive user interface consistent with the principles of the present invention. In this implementation, a display screen 220 comprises two fields: an information display field 250, and a scroll bar field 210. Although scroll bar field 210 is shown adjacent to the right side of the information display field 250, one skilled in the art will appreciate that the scroll bar field may be placed anywhere on display screen 220. For example, scroll bar field 210 may alternatively be located on the left side, top, bottom, or diagonally across from end to end, of display screen 220. Scroll bar field 210 may also be located in the middle of display screen 220, in which case information field 250 may be divided accordingly and displayed around scroll bar field 210. Additionally, more than one scroll bar field may be displayed on display screen 220, depending upon a selected interface configuration. For example, two scroll bar fields may be used with one on the right side and one on the bottom of the display screen.

One skilled in the art will also recognize that the length and width of the scroll bar field may be made any size. To better understand the principles consistent with the present invention, field 210 in FIG. 2 is shown larger than it might be in a typical interface consistent with those principles. A vertical or horizontal scroll bar field, for example, may be a length equal to the height or width of a display or a portion thereof, such as the height or width of an information display field within an area of the display screen. The scroll bar field may also be limited to a width of about three characters or about eight pixels, although this may be adjusted or even adjustable depending upon the interface configuration.

As shown, scroll bar field 210 is displayed in a form to distinguish it from information display field 250 but still permit data to be viewable within field 210. One skilled in the art will recognize that scroll bar field 210 may be distinguished from the information display field using many different display techniques, including a semi-transparent method like that shown in FIG. 2. In this method, the shading of field 210 is distinguishable from field 250, but as those skilled in the art will recognize, in other configurations consistent with the principles of the present invention, field 210 may have a color or shade of a color that distinguishes it from field 250.

FIG. 2 depicts data displayed in both scroll bar field 210 and information display field 250. The current location of the cursor 215 is not within scroll bar field 210, so system 100 determines that the user does not wish to use active scroll bar elements within field 210. If the user manipulates mouse 157, for example, to move cursor 215 into scroll bar field 210, system 100 permits selective use of the scroll bar elements within the field to control a view of data on display screen 220.

FIG. 3 depicts another view of display screen 220 with cursor 215 in field 210. After cursor 215 is in field 210 for a period of time longer than a default time period, for example, one or more seconds depending upon a configuration of the interface, system 100 displays scroll bar elements, including an up arrow 320, a down arrow 325 and a thumb 330, within the scroll bar field 210. The elements are always active, however, so the user can quickly move cursor 215 into field 210, selectively use one of the elements to manipulate the view, e.g., scroll through data, and move cursor 215 out of field 210 before the default time elapses and the elements are displayed. Thus, the elements are always in an active state and a user can select and use one of the elements without system 110 ever displaying them. Those skilled in the art will understand that, although FIG. 3 shows a particular set of elements, i.e., an up arrow, down arrow and thumb, depending upon the particular configuration the set may include a variety of combinations of elements generally used for initiating a scrolling operation. For example, in certain configurations, the set of elements may include the up arrow and down arrow alone; left arrow and right arrow alone; or only a thumb. Such alternatives are within the scope of the principles of the present invention.

As shown in FIG. 3, the elements 320, 325, and 330 are in an opaque form obscuring from view data below in field 210. Those skilled in the art will recognize that the elements may be displayed in other forms, including a semi-transparent form that permits continued view of data in field 210 but still distinguishes them and makes them identifiable within the field. Alternatively, the elements may have a color or shade of a color that distinguishes them from field 250. Additionally, while cursor 215 is shown in FIG. 3 in scroll bar field 210, alternative configurations may involve triggering the process to display the elements with field 210 when cursor 215 is not yet within scroll bar field 210 but is only within a vicinity of the field 210, for example, when cursor 215 is within a few pixels of a separation between field 250 and field 210.

Interface Process

An interface process consistent with the principles of the present invention may be implemented as part of an operating system, in which case the process affects a view of data from a document using all or selected applications, such as word processing programs, spreadsheet programs, database programs, etc., running on a system, such as system 100. Alternatively, the interface process may only modify functionality of selected applications by, for example, incorporating the process into an application or running the process in conjunction with an application.

Figure 4:
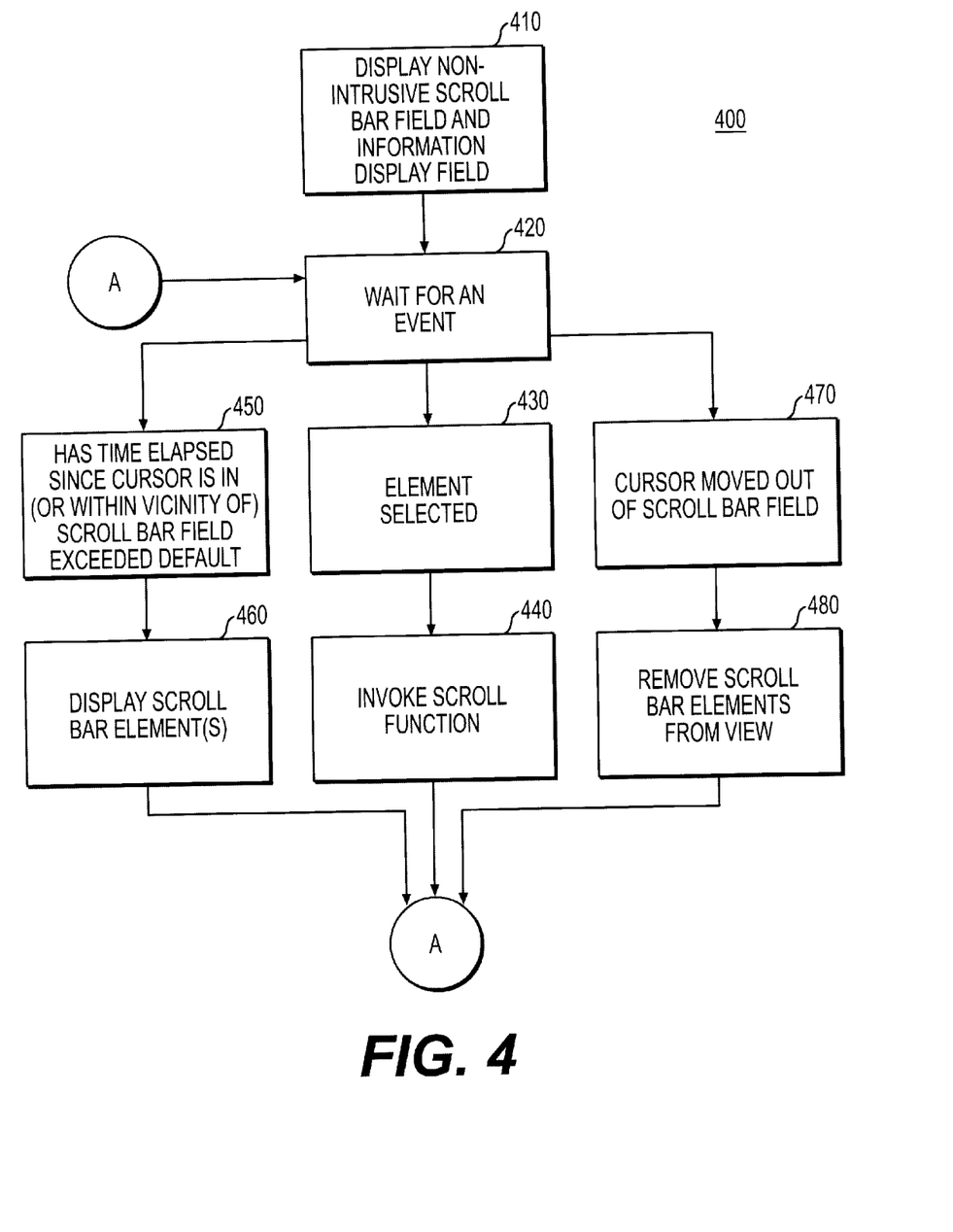
FIG. 4 is a flow chart of the states of an interface process consistent with the present invention.

FIG. 4 is a flow chart of states of an interface process 400 consistent with the principles of the present invention. After a user launches an application on system 100, for example, the system displays on display 170 a display screen using interface process 400 (state 410). The display screen includes at least one non-intrusive scroll bar field and an information display field. The scroll bar field contains active scroll bar elements. In accordance with one implementation, the scroll bar field may be displayed in a semi-transparent form as shown in FIGS. 2 and 3, or in some other form to distinguish it from the information display field as described above. Data related to the application is displayed and viewable within both fields. For example, display screen 220 in FIG. 2 may be displayed by a word processing program and the text of The Gettysburg Address and related historical facts are viewable in both fields.

The process then enters a state waiting for an event to trigger a function (state 420). When the user manipulates the cursor control device to move the cursor in the scroll bar field and triggers a scroll bar element (state 430), process 400 invokes a scroll function in accordance with the selection (state 440). For example, if the user selects the down arrow element to scroll downward in a displayed document, process 400 notifies the application to perform the selected change in the display. Process 400 then returns to state 420 to wait for an event.

When process 400 determines that the cursor is in the scroll bar field for more than a default time (state 450), it invokes a process to display one or more scroll bar elements (state 460). Alternatively, the event triggering process 400 to begin determining when to display a scroll bar element(s) may occur prior to the time that the cursor enters the scroll bar field when the cursor is within a vicinity of the scroll bar field, for example, a few pixels from a separation between the information display field and the scroll bar field. Process 400 then returns to state 420 to wait for an event.

Once the scroll bar elements are displayed in connection with state 460, process 400 responds to an event indicating that the user has manipulated the cursor control device to move the cursor out of the scroll bar field (state 470) by removing any displayed scroll bar elements from view (state 480). After the scroll bar element(s) are removed, process 400 returns to state 420 to wait for an event. The scroll bar elements remain visible on the display screen (state 460) until an event occurs indicating that the elements are to be removed (state 470).

Thus, an element can be selected (state 430) and a function invoked (state 440) without the element(s) being displayed. Alternatively, the element(s) can be displayed (states 450 and 460), after which an element can be selected (state 430) and a function invoked (state 440). Any display elements are removed from view once the cursor is moved out of the scroll bar field (states 470 and 480). In this manner, a user can move the cursor into the scroll bar field, trigger an element, and remove the cursor from the field such that the triggered scroll function is implemented without the process ever displaying the element.

Although process 400 involves a scroll bar field and related control elements, those skilled in the art will understand that, in accordance with the principles of the present invention calling for a non-intrusive user interface, other display fields and related control elements can be implemented in a similar fashion.

Conclusion

Methods, systems, and articles of manufacture consistent with the present invention provide a non-intrusive scroll bar control that does not interfere with the display of data on a display screen. Methods, systems, and articles of manufacture consistent with the present invention permit the display of data within an information display field and within a scroll bar field in a manner such that displayed data is viewable in both fields. Such a non-intrusive scroll bar does not utilize valuable display area; instead it increases the display area available for data.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, it is possible to implement methods consistent with the principles of the present invention using object-oriented facilities like the Java™ Development Kit from Sun Microsystems, Inc., which includes facilities for configuring user interfaces. Those skilled in the art will also recognize that although this description concerns a scroll bar field and related element, a broad variety of display fields and related elements can be used for creating a non-intrusive aspects of a user interface in accordance with the principles of the present invention. The scope of the invention is defined by the claims and their equivalents.

What is claimed is:

1. A method of manipulating a display of information in a system including a processor and a display screen having an information display field and a scroll bar field, said scroll bar field assigned to a particular location on the display screen adjacent to the information display field, and said display screen displaying a cursor at a location in response to signals from a cursor control device, the method comprising:

permitting display of data viewable within both the information display field and the scroll bar field with a set of scroll bar elements assigned to particular locations within the scroll bar field, wherein the scroll bar elements are alternatively in a displayed state, during which the scroll bar elements are viewable within the scroll bar field, and a hidden state, during which the scroll bar elements are not viewable within the scroll bar field;

receiving a cursor control signal from the cursor control device indicating movement of the cursor;

determining whether the received cursor control signal indicates that the cursor entered the scroll bar field;

receiving a signal reflecting selection of a scroll bar element while maintaining the selected scroll bar element in the hidden state; and identifying the selected scroll bar element based on a location of the cursor within the scroll bar field.

2. The method of claim 1, further comprising:

switching at least one of the scroll bar elements to the displayed state.

3. The method of claim 1, wherein the scroll bar field is displayed in a semi-transparent form.

4. The method of claim 1, wherein the scroll bar field is displayed in a different color or shade from the information display field.

5. The method of claim 2, wherein switching at least one of the scroll bar elements to the displayed state includes:

displaying at least one of the scroll bar elements in a form distinguishable from the scroll bar field.

6. The method of claim 2, wherein the scroll bar element is displayed in a semi-transparent form permitting view of data through the scroll bar element within the scroll bar field.

7. The method of claim 2, wherein the scroll bar element is displayed in an opaque form obscuring from view data in the scroll bar field.

8. The method of claim 2, wherein the scroll bar element is displayed in a different color or shade from the scroll bar field.

9. The method of claim 1, further comprising:

switching the scroll bar elements to the displayed state based on a determination that a predetermined time has elapsed since the cursor entered a vicinity adjacent the scroll bar field.

10. The method of claim 1, further comprising:

switching the scroll bar elements to a displayed state when the cursor enters a vicinity adjacent the scroll bar field.

11. The method of claim 1, further comprising:

switching the scroll bar elements to the displayed state based on a determination that a predetermined period has elapsed since the cursor entered the scroll bar field.

12. The method of claim 1, further comprising:

performing an operation on the displayed data corresponding to the selected scroll bar element.

13. The method of claim 1, further comprising:

altering a viewable characteristic of the scroll bar field when it is determined that a predetermined period has elapsed since the cursor entered the scroll bar field making the scroll bar field viewably distinguishable from the information display field on the display screen.

14. The method of claim 1, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

15. A method of displaying scroll bar elements in a system including a processor and a display screen, comprising:

providing a user interface having an information display field and a scroll bar field wherein said scroll bar field is assigned to a particular location on the display screen adjacent to the information display field;

permitting an application to display data viewable within both the information display field and the scroll bar field with a set of scroll bar elements assigned to particular locations within the scroll bar field, wherein the scroll bar elements are alternatively in a displayed state, during which the scroll bar elements are viewable within the scroll bar field, and a hidden state, during which the scroll bar elements are not viewable within the scroll bar field;

receiving a cursor control signal from the cursor control device indicating movement of the cursor;

determining whether the received cursor control signal indicates that the cursor entered the scroll bar field;

receiving a signal reflecting selection of a scroll bar element while maintaining the selected scroll bar element in the hidden state; and identifying the selected scroll bar element based on a location of the cursor within the scroll bar field.

16. The method of claim 15, further comprising:

switching at least one of the scroll bar elements to the displayed state.

17. The method of claim 15, wherein the scroll bar field is displayed in a semi-transparent form.

18. The method of claim 15, wherein the scroll bar field is displayed in a different color of shade from the information display field.

19. The method of claim 16, wherein switching at least one of the scroll bar elements to the displayed state includes:

displaying at least one of the scroll bar elements in a form distinguishable from the scroll bar field.

20. The method of claim 15, wherein the scroll bar element is displayed in a semi-transparent form permitting view of data through the scroll bar element within the scroll bar field.

21. The method of claim 15, wherein the scroll bar element is displayed in an opaque form obscuring from view data in the scroll bar field.

22. The method of claim 15, wherein the scroll bar element is displayed in a different color or shade from the scroll bar field.

23. The method of claim 15, further comprising:

switching the scroll bar elements to the displayed state based on a determination that a predetermined time has elapsed since the cursor entered a vicinity adjacent the scroll bar field.

24. The method of claim 15, further comprising:

switching the scroll bar elements to the displayed state when the cursor enters a vicinity adjacent the scroll bar field.

25. The method of claim 15, further comprising:

switching the scroll bar elements to the displayed state based on a determination that a predetermined period has elapsed since the cursor entered the scroll bar field.

26. The method of claim 15, further comprising:

performing an operation on the displayed data corresponding to the selected scroll bar element.

27. The method of claim 15, further comprising:

altering a viewable characteristic of the scroll bar field when it is determined that a predetermined period has elapsed since the cursor entered the scroll bar field making the scroll bar field viewably distinguishable from the information display field on the display screen.

28. The method of claim 15, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

29. An apparatus for displaying scroll bar elements, comprising:

a memory having program instructions;

a display screen; and a processor responsive to the program instructions, to provide a user interface having an information display field and a scroll bar field wherein said scroll bar field is assigned to a particular location on the display screen adjacent to the information display field;

permit display of data viewable within both an information display field and a scroll bar field on the display screen with a set of scroll bar elements assigned to particular locations within the scroll bar field, wherein the scroll bar elements are alternatively in a displayed state, during which the scroll bar elements are viewable within the scroll bar field, and a hidden state, during which the scroll bar elements are not viewable within the scroll bar field;

receive a cursor control signal from the cursor control device indicating movement of the cursor;

determine whether the received cursor control signal indicates that the cursor entered the scroll bar field;

receive a signal reflecting selection of a scroll bar element while maintaining the selected scroll bar element in the hidden state; and identify the selected scroll bar element based on a location of the cursor within the scroll bar field.

30. The apparatus of claim 29, wherein the processor is further configured to:

switch at least one of the scroll bar elements to the displayed state.

31. The apparatus of claim 29, wherein the processor is configured to display the scroll bar field in a semi-transparent form field.

32. The apparatus of claim 29, wherein the processor is configured to display the scroll bar field in a different color or shade from the information display field.

33. The apparatus of claim 30, wherein the processor is further configured to display at least one of the scroll bar elements in a form distinguishable from the scroll bar field.

34. The apparatus of claim 30, wherein the processor is configured to display the scroll bar element in a semi-transparent form permitting view of data through the scroll bar element within the scroll bar field.

35. The apparatus of claim 30, wherein the processor is configured to display the scroll bar element in an opaque form obscuring from view data in the scroll bar field.

36. The apparatus of claim 30, wherein the processor is configured to display the scroll bar element in a different color or shade from the scroll bar field.

37. The apparatus of claim 29, wherein the processor is further configured to:

switch the scroll bar elements to the displayed state based on a determination that a predetermined time has elapsed since the cursor entered a vicinity adjacent the scroll bar field.

38. The apparatus of claim 29, wherein the processor is further configured to:
   switch the scroll bar elements to a displayed state when the cursor enters a vicinity adjacent the scroll bar field.

39. The apparatus of claim 29, wherein the processor is further configured to:
   switch the scroll bar elements to the displayed state based on a determination that a predetermined period has elapsed since the cursor entered the scroll bar field.

40. The apparatus of claim 29, wherein the processor is further configured to:
   perform an operation on the displayed data corresponding to the selected scroll bar element.

41. The method of claim 29, wherein the processor is further configured to:
   alter a viewable characteristic of the scroll bar field when it is determined that a predetermined period has elapsed since the cursor entered the scroll bar field making the scroll bar field viewably distinguishable from the information display field on the display screen.

42. The apparatus of claim 29, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

43. An apparatus for displaying scroll bar elements, comprising:
   a memory having program instructions;
   a display screen; and
   a processor responsive to the program instructions, to
      provide on the display screen a user interface having an information display field and a scroll bar field wherein said scroll bar field is assigned to a particular location on the display screen adjacent to the information display field;
      permit the display of data viewable within both the information display field and the scroll bar field with a set of scroll bar elements assigned to particular locations within the scroll bar field, wherein the scroll bar elements are alternatively in a displayed state, during which the scroll bar elements are viewable within the scroll bar field, and a hidden state, during which the scroll bar elements are not viewable within the scroll bar field;
      receive a cursor control signal from the cursor control device indicating movement of the cursor;
      determine whether the received cursor control signal indicates that the cursor entered the scroll bar field;
      receive a signal reflecting selection of a scroll bar element while maintaining the selected scroll bar element in the hidden state; and
      identify the selected scroll bar element based on a location of the cursor within the scroll bar field.

44. The apparatus of claim 43, wherein the processor is further configured to:
   switch at least one of the scroll bar elements to the displayed state.

45. The apparatus of claim 43, wherein the processor is configured to display the scroll bar field in a semi-transparent form.

46. The apparatus of claim 43, wherein the processor is configured to display the scroll bar field in a different color or shade from the information display field.

47. The apparatus of claim 44, wherein the processor is configured to
   display at least one of the scroll bar elements in a form distinguishable from the scroll bar field.

48. The apparatus of claim 44, wherein the processor is configured to display the scroll bar element in a semi-transparent form permitting view of data through the scroll bar element within the scroll bar field.

49. The apparatus of claim 44, wherein the processor is configured to display the scroll bar element in an opaque form obscuring from view data in the scroll bar field.

50. The apparatus of claim 44, wherein the processor is configured to display the scroll bar element in a different color or shade from the scroll bar field.

51. The apparatus of claim 43, wherein the processor is further configured to:
   switch the scroll bar elements to the displayed state based on a determination that a predetermined time has elapsed since the cursor entered a vicinity adjacent the scroll bar field.

52. The apparatus of claim 43, wherein the processor is further configured to:
   switch the scroll bar elements to the displayed state when the cursor enters a vicinity adjacent the scroll bar field.

53. The apparatus of claim 43, wherein the processor is further configured to:
   switch the scroll bar elements to the displayed state based on a determination that a predetermined period has elapsed since the cursor entered the scroll bar field.

54. The apparatus of claim 43, wherein the processor is further configured to:
   perform an operation on the displayed data corresponding to the selected scroll bar element.

55. The apparatus of claim 43, wherein the processor is further configured to:
   alter a viewable characteristic of the scroll bar field when it is determined that a predetermined period has elapsed since the cursor entered the scroll bar field making the scroll bar field viewably distinguishable from the information display field on the display screen.

56. The apparatus of claim 43, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

57. A computer-readable medium containing instructions for controlling a system to perform a method, the system including a processor and a display screen having an information display field and a scroll bar field, wherein said scroll bar field is assigned to a particular location on the display screen adjacent to the information display field, said display screen displaying a cursor at a location in response to signals from a cursor control device, the method comprising:
   permitting display of data viewable within both the information display field and the scroll bar field with a set of scroll bar elements assigned to particular locations within the scroll bar field, wherein the scroll bar elements are alternatively in a displayed state, during which the scroll bar elements are viewable within the scroll bar field, and a hidden state, during which the scroll bar elements are not viewable within the scroll bar field;

receiving a cursor control signal from the cursor control device indicating movement of the cursor;

determining whether the received cursor control signal indicates that the cursor entered the scroll bar field;

receiving a signal reflecting selection of a scroll bar element while maintaining the selected scroll bar element in the hidden state; and identifying the selected scroll bar element based on a location of the cursor within the scroll bar field.

58. The computer-readable medium of claim 57, further including:

switching at least one of the scroll bar elements to the displayed state.

59. The computer-readable medium of claim 57, wherein the scroll bar field is displayed in a semi-transparent form.

60. The computer-readable medium of claim 57, wherein the scroll bar field is displayed in a different color or shade from the information display field.

61. The computer-readable medium of claim 58 further including:

displaying at least one of the scroll bar elements in a form distinguishable from the scroll bar field.

62. The computer-readable medium of claim 58, wherein the scroll bar element is displayed in a semi-transparent form permitting view of data through the scroll bar element within the scroll bar field.

63. The computer-readable medium of claim 58, wherein the scroll bar element is displayed in an opaque form obscuring from view data in the scroll bar field.

64. The computer-readable medium of claim 58, wherein the scroll bar element is displayed in a different color or shade from the scroll bar field.

65. The computer-readable medium of claim 57, further including:

switching the scroll bar elements to the displayed state based on a determination that a predetermined time has elapsed since the cursor entered a vicinity adjacent the scroll bar field.

66. The computer-readable medium of claim 57, further including:

switching the scroll bar elements to a displayed state when the cursor enters a vicinity adjacent the scroll bar field.

67. A computer-readable medium containing instructions for controlling a system to perform a method for displaying scroll bar elements, the system including a processor and a display screen, the method comprising:

providing a user interface having an information display field and a scroll bar field wherein said scroll bar field is assigned to a particular location on the display screen adjacent to the information display field;

permitting display of data viewable within both the information display field and the scroll bar field with a set of scroll bar elements assigned to particular locations within the scroll bar field, wherein the scroll bar elements are alternatively in a displayed state, during which the scroll bar elements are viewable within the scroll bar field, and a hidden state, during which the scroll bar elements are not viewable within the scroll bar field;

receiving a cursor control signal from the cursor control device indicating movement of the cursor;

determining whether the received cursor control signal indicates that the cursor entered the scroll bar field;

receiving a signal reflecting selection of a scroll bar element while maintaining the selected scroll bar element in the hidden state; and identifying the selected scroll bar element based on a location of the cursor within the scroll bar field.

68. The computer-readable medium of claim 57, further comprising:

switching the scroll bar elements to the displayed state based on a determination that a predetermined period has elapsed since the cursor entered the scroll bar field.

69. The computer-readable medium of claim 57, further comprising:

performing an operation on the displayed data corresponding to the selected scroll bar element.

70. The computer-readable medium of claim 57, further comprising:

altering a viewable characteristic of the scroll bar field when it is determined that a predetermined period has elapsed since the cursor entered the scroll bar field making the scroll bar field viewably distinguishable from the information display field on the display screen.

71. The computer-readable medium of claim 57, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

72. The computer-readable medium of claim 68, further comprising displaying one of the hidden scroll bar elements in the scroll bar field.

73. The computer-readable medium of claim 67, wherein the scroll bar field is displayed in a semi-transparent form.

74. The computer-readable medium of claim 67, wherein the scroll bar field is displayed in a different color or shade from the information display field.

75. The computer-readable medium of claim 67, further comprising:

switching the scroll bar elements to the displayed state based on a determination that a predetermined period has elapsed since the cursor entered the scroll bar field.

76. The computer-readable medium of claim 68, further comprising:

performing an operation on the displayed data corresponding to the selected scroll bar element.

77. The computer-readable medium of claim 67, further comprising:

altering a viewable characteristic of the scroll bar field when it is determined that a predetermined period has elapsed since the cursor entered the scroll bar field making the scroll bar field viewably distinguishable from the information display field on the display screen.

78. A method of displaying a document on a display screen, said display screen displaying a cursor at a location in response to signals from a cursor control device, comprising:

providing a user interface where an application displays at least a portion of the document viewable in a designated area of the display screen and an adjacent area of the display screen, wherein the designated area has a display characteristic distinguishing the designated area from the adjacent area and contains a set of hidden control elements for implementing an operation, wherein the set of hidden control elements includes scroll bar elements that are alternatively in a displayed state, during which the scroll bar elements are viewable within the designated area, and a hidden state, during which the scroll bar elements are not viewable within the designated area; and invoking the operation in response to a signal activating one of the hidden control elements, wherein the activating occurs when a signal reflects a selection of a scroll bar element while maintaining the selected scroll bar element in the hidden state.

79. The method of claim 78, wherein invoking the operation includes changing a view of the document within both the designated area and the adjacent area.

80. The method of claim 78, wherein the adjacent area is an information display field and the designated area is a scroll bar field.

81. The method of claim 78, wherein invoking the operation includes:

displaying a feature associated with one of the hidden control elements.

82. The method of claim 78, wherein the designated area is displayed in a semi-transparent form.

83. The method of claim 78, wherein the designated area is displayed in a different color or shade from the adjacent area.

84. The method of claim 81, wherein activating one of the hidden control elements further includes:

displaying at least one of the scroll bar elements in a form distinguishable from the scroll bar field.

85. The method of claim 81, wherein one of hidden control elements is displayed in a semi-transparent form permitting view of data through one of hidden control elements within the designated area.

86. The method of claim 81, wherein one of the hidden control elements is displayed in an opaque form obscuring from view data in the designated area.

87. The method of claim 81 wherein one of the hidden control elements is displayed in a different color or shade from the designated area.

88. The method of claim 78, further comprising:

switching the scroll bar elements to the displayed state based on a determination that a predetermined period has elapsed since the cursor entered the adjacent area.

89. The computer-readable medium of claim 67, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

90. The method of claim 78, further comprising:

performing an operation on the displayed data corresponding to the activated scroll bar element.

91. The method of claim 78, further comprising:

altering a viewable characteristic of the adjacent area when it is determined that a predetermined period has elapsed since the cursor entered the adjacent area making the adjacent area viewably distinguishable from the designated area on the display screen.

92. A method of manipulating a display of information in a system including a processor and a display screen having an information display field and a scroll bar field, said scroll bar field assigned to a particular location on the display screen adjacent to the information display field, and said display screen displaying a cursor at a location in response to signals from a cursor control device, the method comprising:

permitting display of data viewable within both the information display field and the scroll bar field with a set of scroll bar elements assigned to particular locations within the scroll bar field wherein the scroll bar elements are alternatively in a displayed state, during which the scroll bar elements are viewable within the scroll bar field, and a hidden state, during which the scroll bar elements are not viewable within the scroll bar field; and receiving a cursor control signal from the cursor control device indicating movement of the cursor;

determining whether the received cursor control signal indicates that the cursor entered the scroll bar field while the scroll bar elements are in a hidden state;

receiving a signal reflecting selection of a scroll bar element; and identifying the selected scroll bar element based on a location of the cursor within the scroll bar field.

93. The method of claim 92, further comprising:

switching the scroll bar elements to the displayed state based on a determination that a predetermined period has elapsed since the cursor entered the scroll bar field.

94. The method of claim 92, further comprising:

performing an operation on the displayed data corresponding to the selected scroll bar element.

95. The method of claim 92, further comprising:

altering a viewable characteristic of the scroll bar field when it is determined that a predetermined period has elapsed since the cursor entered the scroll bar field making the scroll bar field viewably distinguishable from the information display field on the display screen.

96. The method of claim 78, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

97. The method of claim 92, wherein the scroll bar field is adjacent to the information display field by being one of adjacent to the right of the information display field, adjacent to the left of the information display field, adjacent to the top of the information display field, adjacent to the bottom of the information display field, diagonally across the information display field, and adjacent to the middle of the information display field such that the information display field is split on either side of the scroll bar field.

98. The method of claim 78, further comprising:

switching the scroll bar elements to the displayed state based on a determination that a predetermined time has elapsed since the cursor entered a vicinity adjacent the scroll bar field.

99. The method of claim 78, further comprising:

switching the scroll bar elements to a displayed state when the cursor enters a vicinity adjacent the scroll bar field.

100. An apparatus for displaying a document on a display screen, said display screen displaying a cursor at a location in response to signals from a cursor control device, comprising:

means for providing a user interface where an application displays at least a portion of the document viewable in a designated area of the display screen and an adjacent area of the display screen, wherein the designated area has a display characteristic distinguishing the designated area from the adjacent area and contains a set of hidden control elements for implementing an operation, wherein the set of hidden control elements includes scroll bar elements that are alternatively in a displayed state, during which the scroll bar elements are viewable within the designated area, and a hidden state, during which the scroll bar elements are not viewable within the designated area; and means for invoking the operation in response to a signal activating one of the hidden control elements, wherein the activating occurs when a signal reflects a selection of a scroll bar element while maintaining the selected scroll bar element in the hidden state.

\* \* \* \* \*

UNITED STATES PATENT AND TRADEMARK OFFICE
CERTIFICATE OF CORRECTION

PATENT NO.      : 6,570,594 B1
DATED           : May 27, 2003
INVENTOR(S)     : Annette Wagner It is certified that error appears in the above-identified patent and that said Letters Patent is hereby corrected as shown below:

<u>Column 9,</u>
Line 26, replace "color of shade" with -- color or shade --.

<u>Column 10,</u>
Line 44, replace "form" with -- from --.

<u>Column 14,</u>
Lines 30-32, delete the claim in its entirety and insert therefore:
-- The computer-readable medium of claim 67, further including:
    switching at least one of the scroll bar elements to the displayed state. --.
Line 44, replace "68" with -- 67 --.

<u>Column 15,</u>
Line 30, replace "of hidden" with -- of the hidden --.

Signed and Sealed this

Twenty-third Day of September, 2003

JAMES E. ROGAN
*Director of the United States Patent and Trademark Office*